US012343983B2

(12) United States Patent
Nakahata et al.

(10) Patent No.: US 12,343,983 B2
(45) Date of Patent: Jul. 1, 2025

(54) TRANSPORTATION APPARATUS AND PRINTING APPARATUS

(71) Applicant: SEIKO EPSON CORPORATION, Tokyo (JP)

(72) Inventors: Akinobu Nakahata, Shiojiri (JP); Soichiro Kii, Shiojiri (JP); Atsushi Mukaida, Shiojiri (JP); Yosaku Tamura, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 195 days.

(21) Appl. No.: 18/335,573

(22) Filed: Jun. 15, 2023

(65) Prior Publication Data

US 2023/0321981 A1 Oct. 12, 2023

Related U.S. Application Data

(63) Continuation of application No. 17/645,126, filed on Dec. 20, 2021, now Pat. No. 11,724,504.

(30) Foreign Application Priority Data

Dec. 23, 2020 (JP) ................................. 2020-214095

(51) Int. Cl.
*B41J 13/00* (2006.01)
*B41J 29/13* (2006.01)
*B41J 29/38* (2006.01)

(52) U.S. Cl.
CPC ........... *B41J 13/0009* (2013.01); *B41J 13/00* (2013.01); *B41J 29/38* (2013.01)

(58) Field of Classification Search
CPC ...... B41J 13/00; B41J 13/009; B41J 13/0009; B41J 13/0018; B41J 13/0027;
(Continued)

(56) References Cited

U.S. PATENT DOCUMENTS

2007/0007715 A1* 1/2007 Yoshida ..................... B41J 3/60
271/187
2007/0147882 A1* 6/2007 Igarashi ................... B41J 29/13
399/110
(Continued)

FOREIGN PATENT DOCUMENTS

JP 2019-014253 A 1/2019

*Primary Examiner* — Jason S Uhlenhake
(74) *Attorney, Agent, or Firm* — WORKMAN NYDEGGER

(57) ABSTRACT

A transportation portion includes an apparatus body, a cover, first and second path formation portions, and a movement portion. The apparatus body has a transportation path including a downward path and an upward path having portions located at the same level in the Z direction. The cover covers and uncovers the transportation path. The first path formation portion is movable to a first position and to a second position. The second path formation portion defines the upward path and defines the downward path with the first path formation portion. The movement portion moves the first path formation portion in response to opening or closing of the cover. The first path formation portion is positioned in a movement area during a closed state. The movement portion moves the first path formation portion to the second position when the cover is opened and to the first position when the cover is closed.

13 Claims, 11 Drawing Sheets

(58) Field of Classification Search
CPC ................ B41J 13/0036; B41J 13/0045; B41J 13/0054; B41J 13/0063; B41J 13/0072; B41J 29/38; B41J 29/13
See application file for complete search history.

(56) References Cited

U.S. PATENT DOCUMENTS

| | | | | |
|---|---|---|---|---|
| 2009/0237440 | A1* | 9/2009 | Enomoto | B41J 29/38 347/19 |
| 2015/0246559 | A1* | 9/2015 | Moriyama | B41J 11/04 347/104 |
| 2019/0009563 | A1 | 1/2019 | Tokisawa et al. | |
| 2020/0346468 | A1 | 11/2020 | Tokisawa et al. | |

* cited by examiner

TRANSPORTATION APPARATUS AND PRINTING APPARATUS

This application is a continuation of U.S. patent application Ser. No. 17/645,126, filed Dec. 20, 2021, which is based on, and claims priority from JP Application Serial Number 2020-214095, filed Dec. 23, 2020, the disclosures of which are hereby incorporated by reference herein in their entirety.

BACKGROUND

1. Technical Field

The present disclosure relates to a transportation apparatus and a printing apparatus.

2. Related Art

The ink jet recording apparatus in JP-A-2019-14253 has a transportation path along which a recording medium is transported upward from an upstream transportation roller toward a downward transportation roller in the transportation direction.

In the ink jet recording apparatus in JP-A-2019-14253, the transportation path may have a downward section and an upward section such that the transportation path has portions at the same level in the apparatus height direction. This configuration makes the transportation path longer without increasing the size of the apparatus. The transportation path is defined by a component that stays in the apparatus body and a component that opens and closes relative to the apparatus body. However, in such a configuration, when the transportation path is uncovered, the components may interfere with each other due to the downward section and the upward section of the transportation path, making it impossible to uncover the transportation path.

SUMMARY

To solve the above-described problem, a transportation apparatus according to an aspect of the present disclosure includes an apparatus body having a transportation path including a downward path along which a medium is transported downward in an apparatus height direction and an upward path along which the medium is transported upward in the apparatus height direction, the downward path and the upward path having portions located at the same level in the apparatus height direction, a cover disposed on the apparatus body and configured to cover and uncover the transportation path, a first path formation portion disposed in the apparatus body and configured to be moved to a first position and to a second position, the first path formation portion defining a portion of the downward path when positioned at the first position and being away from the downward path when positioned at the second position, a second path formation portion disposed on the cover, the second path formation portion defining the upward path and defining the downward path with the first path formation portion during a closed state in which the cover covers the transportation path, and a movement portion configured to move the first path formation portion to the first position or the second position in response to opening or closing of the cover. At least a portion of the first path formation portion is positioned in a movement area of the second path formation portion during the closed state, and the movement portion moves the first path formation portion to the second position when the cover is opened and moves the first path formation portion to the first position when the cover is closed.

DESCRIPTION OF EXEMPLARY EMBODIMENTS

Figure 1:
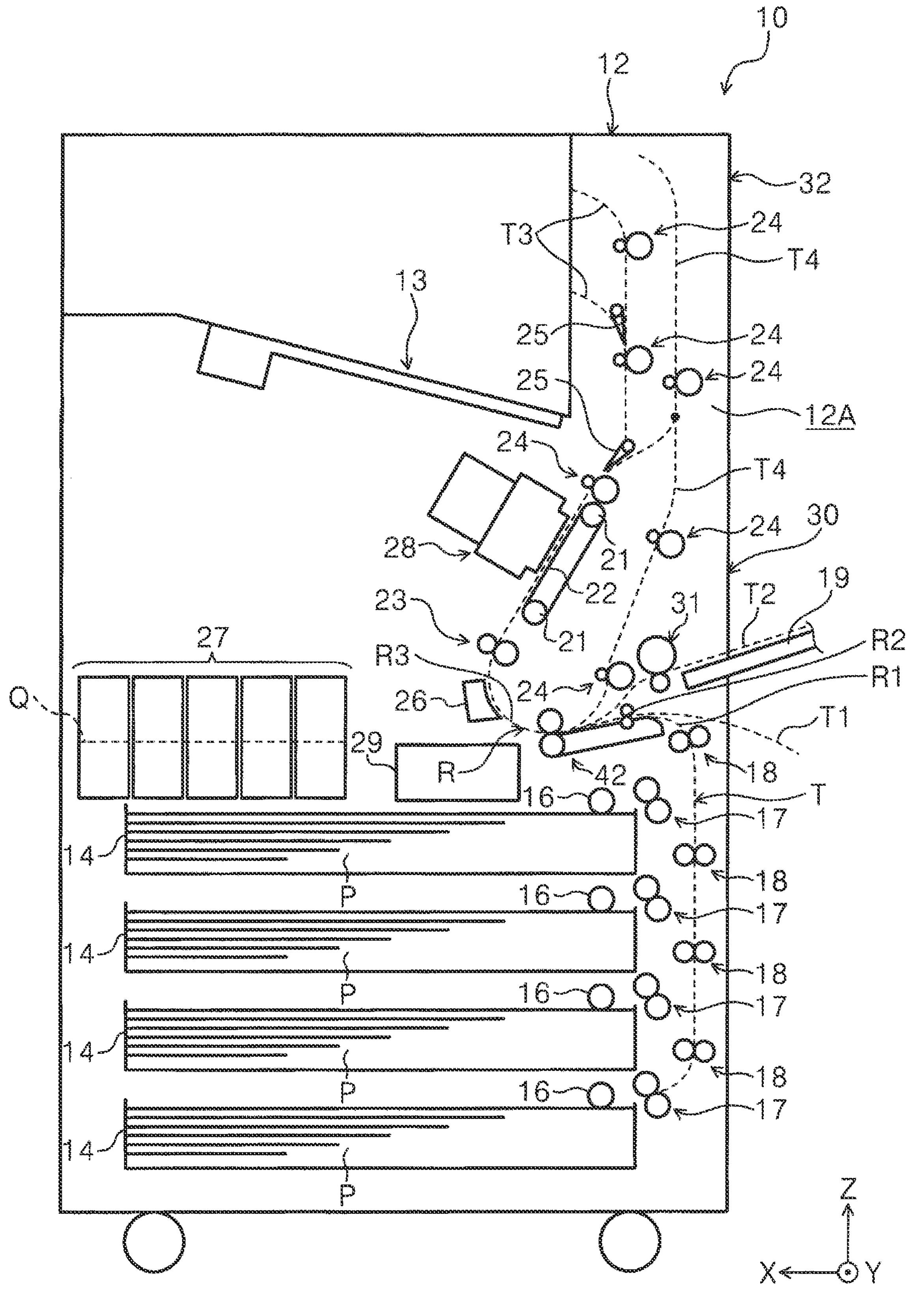
FIG. 1 is a view illustrating a transportation path of paper in a printer according to an embodiment.

Hereinafter, an outline of the present disclosure will be described. A transportation apparatus according to an aspect of the present disclosure includes an apparatus body having a transportation path including a downward path along which a medium is transported downward in an apparatus height direction and an upward path along which the medium is transported upward in the apparatus height direction, the downward path and the upward path having portions located at the same level in the apparatus height direction, a cover disposed on the apparatus body and configured to cover and uncover the transportation path, a first path formation portion disposed in the apparatus body and configured to be moved to a first position and to a second position, the first path formation portion defining a portion of the downward path when positioned at the first position and being away from the downward path when positioned at the second position, a second path formation portion disposed on the cover, the second path formation portion defining the upward path and defining the downward path with the first path formation portion during a closed state in which the cover covers the transportation path, and a movement portion configured to move the first path formation portion to the first position or the second position in response to opening or closing of the cover. At least a portion of the first path formation portion is positioned in a movement area of the second path formation portion during the closed state, and the movement portion moves the first path formation portion to the second position when the cover is opened and moves the first path formation portion to the first position when the cover is closed.

In this configuration, the transportation apparatus, which includes the upward path and the downward path having portions located at the same level in the apparatus height direction, has a longer transportation path than a configuration that has a transportation path extending in a straight line in the apparatus height direction. Furthermore, at least a portion of the first path formation portion is positioned in the movement area of the second path formation portion when the cover is in the closed state. In other words, at least a portion of the first path formation portion and at least a portion of the second path formation portion overlap each other in the apparatus height direction. This makes the transportation apparatus smaller. Furthermore, when the cover is opened, the movement portion moves the first path formation portion to the second position such that the first path formation portion is away from the movement area of the second path formation portion. In this state, the cover is freely openable and the transportation path is readily uncovered. This makes it easy to remove the medium left in the transportation path due to jamming, for example.

In the transportation apparatus, the first path formation portion and the second path formation portion may be positioned to face each other with a predetermined distance therebetween to define the downward path, and when the movement portion moves the first path formation portion to the second position, a distance between the first path formation portion and the second path formation portion may be kept at a distance equal to or larger than the predetermined distance.

In this configuration, during the movement of the first path formation portion to the second position, a distance equal to or larger than the predetermined distance is kept between the first path formation portion and the second path formation portion. In other words, the first path formation portion and the second path formation portion are unlikely to be in contact with each other, reducing the possibility that the medium left in the transportation path will be damaged.

In the transportation apparatus, the first path formation portion may include a medium support configured to support the medium and a first rotation shaft supporting the medium support in such a manner that the medium support is turned to the first position or the second position. The first rotation shaft may be located below the movement area of the second path formation portion in the apparatus height direction.

In this configuration, the first path formation portion is moved to the first position or the second position by being turned about the first rotation shaft. With this simple configuration, the first path formation portion is moved. Furthermore, the first rotation shaft is located below the movement area of the second path formation portion. Thus, the first rotation shaft does not come in contact with the second path formation portion.

The transportation apparatus may further include a retainer configured to hold the first path formation portion at the first position, the retainer being configured to cancel the holding of the first path formation portion when the cover is opened.

In this configuration, when the cover is opened, the retainer cancels the holding of the first path formation portion. When the holding is cancelled, the first path formation portion is supported only at one end by the first rotation shaft and is turned by its own weight. With this simple configuration, the movement area of the second path formation portion is opened.

In the transportation apparatus, the retainer may include a second rotation shaft, a lever fixed to the second rotation shaft and configured to turn the second rotation shaft in response to opening or closing of the cover, and a support fixed to the second rotation shaft to support the medium support at the first position, the lever may be in contact with the cover when the cover is in the closed state and the lever may be away from the cover when the cover is in the open state, and the support may support the medium support when the lever is in contact with the cover.

In this configuration, the lever is in contact with the cover when the cover is in the closed state, and thus the lever receives a pressing force. The pressing force allows the lever to turn the second rotation shaft and the support. The support is turned to push up the medium support and then supports the medium support at the first position. When the cover is opened, the medium support is moved down under its own weight and the support is turned to open the movement area of the second path formation portion. In this way, the opening and closing of the cover moves the medium support or the first path formation portion.

In the transportation apparatus, the movement portion may also function as the retainer.

In this configuration, the transportation portion does not require a retainer as a separate component from the movement portion. This simplifies the configuration for moving and holding the first path formation portion.

In the transportation apparatus, the first rotation shaft may have a first transportation roller configured to transport the medium, the second path formation portion may have a second transportation roller configured to transport the medium with the first transportation roller, and when the cover is in the closed state, the first transportation roller and the second transportation roller may form a nipping portion at which the medium is sandwiched therebetween, and when the cover is open, the nipping portion is not formed.

In this configuration, of the nipping portions between the pairs of rollers that transport the medium along the transportation path, the nipping portion formed between the first transportation roller and the second transportation roller disappears when the cover is opened. Thus, the medium left in the transportation path is readily removable.

In the transportation apparatus, the first path formation portion may include a support roller configured to support the medium, the second path formation portion may include a counter roller opposed to the support roller and configured to be rotated together with the support roller to transport the medium, and when the first path formation portion is positioned at the first position, the support roller and the counter roller may be in a nipping state, and when the first path formation portion is positioned at the second position, the nipping state of the support roller and the counter roller may be cancelled.

In this configuration, of the nipping portions between the pairs of rollers that transport the medium along the transportation path, the nipping portion formed between the support roller and the counter roller disappears when the cover is opened. Thus, the medium left in the transportation path is readily removable.

In the transportation apparatus, the movement portion may be configured to move up the first path formation portion in the apparatus height direction to move up the support roller to a position where the support roller and the counter roller are put in the nipping state.

In this configuration, the first path formation portion moved by the movement portion puts the support roller and the counter roller into the nipping state. This simple configuration allows the support roller and the counter roller to be in the nipping state unlike a configuration in which the movement of the first path formation portion and operation to put the support roller and the counter roller into the nipping state are separately performed.

A printing apparatus according to another aspect of the present disclosure includes the above-descried transportation apparatus and a recording portion configured to record on a medium transported by the transportation apparatus.

In the printing apparatus, the same effects and advantages as those obtained in the above-described transportation apparatus are obtained.

Hereinafter, a transportation portion 30 as an example of the transportation apparatus and a printer 10 as an example of the printing apparatus according to the present disclosure will be described in detail. As illustrated in FIG. 1, the printer 10 is an ink jet printer that ejects ink Q, which is an example of a liquid, onto a sheet of paper P, which is an example of a medium, to record. In the drawings, the X-Y-Z coordinate system is a Cartesian coordinate system. The X direction corresponds to an apparatus width direction viewed from the user of the printer 10 and extends horizontally. The X direction includes a +X direction directed toward the left and a −X direction directed toward the right. The Y direction corresponds to a paper width direction, which intersects a transportation direction of the paper P, and an apparatus depth direction and extends horizontally. The Y direction includes a +Y direction directed toward the front and a −Y direction directed toward the rear. The Z direction is an example of an apparatus height direction and extends vertically. The Z direction includes a +Z direction directed upward and a −Z direction directed downward. In this embodiment, the term “upward” indicates a direction including an upward component in the Z direction and the term “downward” indicates a direction including a downward component in the Z direction.

In the printer 10, the paper P is transported along the transportation path T indicated by a broken line. The transportation direction of the paper P is a direction along the transportation path T and thus varies depending on sections of the transportation path T. The printer 10 includes an apparatus body 12, a transportation portion 30, which will be described later, and a line head 28. The apparatus body 12 includes a housing that forms an outer shape of the apparatus body 12. The apparatus body 12 includes a discharging portion 13 that is located away in the +Z direction from the center in the Z direction of the apparatus body 12 and that has a space to receive recorded paper P. The apparatus body 12 further includes multiple paper cassettes 14. The apparatus body 12 includes an opening 12A opening in the X direction at the end in the −X direction. When the opening 12A is uncovered, the transportation path T, which will be described later, is exposed.

The paper cassettes 14 store the paper P. The paper P in the paper cassettes 14 is transported along the transportation path T by pick rollers 16 and pairs of transportation rollers 17 and 18. The transportation path T includes a transportation pathway T1 and a transportation pathway T2 that join together. The paper P fed from an external device (not illustrated) is transported along the transportation pathway T1. The paper P fed through a pair of feeding rollers 31 from a manual feed tray 19 on the apparatus body 12 is transported along the transportation pathway T2. A portion of the printer 10 located away in the −X direction from the center in the X direction of the printer 10 is the transportation portion 30, which is an example of the transportation apparatus configured to transport the paper P. The transportation portion 30 will be described in detail later. In one example, the body of the transportation portion 30 is also used as the apparatus body 12.

The transportation path T has two pulleys 21, a transportation belt 22 wound on the two pulleys 21, a pair of resist rollers 23 that corrects skew of the paper P, for example, pairs of transportation rollers 24 that transport the paper P, flaps 25 that switch transportation paths of the paper P, and a medium width sensor 26 that determines the width in the Y direction of the paper P. In the transportation path T, a transportation pathway T3 extending to the discharging portion 13 and an inversion pathway T4 where the paper P is inverted are located downstream of the transportation belt 22.

The transportation path T has a curved path R located upstream of the medium width sensor 26. The curved path R has two crests and one trough. Specifically described, the curved path R includes an introduction path R1 that curves from the pair of transportation rollers 18 to a +X direction and +Z direction side, a downward path R2 that curves downward from the end in the +X direction of the introduction path R1 to a +X direction and −Z direction side, and an upward path R3 that curves upward from the end in the +X direction of the downward path R2 to a +X direction and +Z direction side.

The apparatus body 12 houses an ink tank 27 that contains ink Q, the line head 28, and a controller 29 that controls operations of the components of the printer 10. The line head 28 is located downstream of the medium width sensor 26 in the transportation direction of paper P. The line head 28 is an example of a recording portion and ejects the ink Q supplied from the ink tank 27 to record on the paper P transported by the transportation portion 30. The controller 29 includes a central processing unit (CPU), read-only memory (ROM), random-access memory (RAM), and a storage, which are not illustrated, to control transportation of the paper P in the printer 10 and control operations of the components including the line head 28 and the transportation portion 30.

Figure 6:
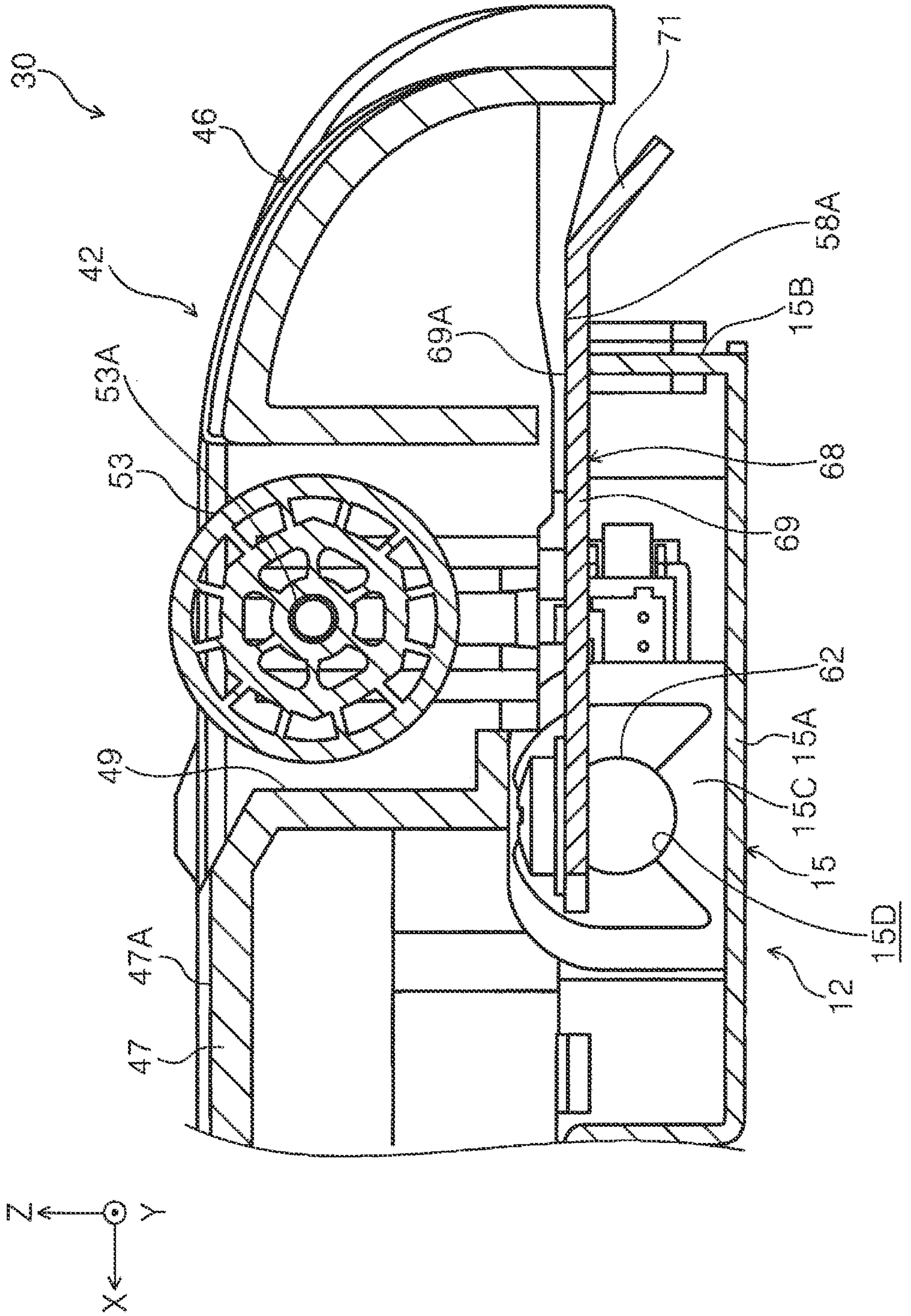
FIG. 6 is a vertical cross-sectional view illustrating the lower guide that is included in the transportation portion according to an embodiment and supported by a body frame.

As illustrated in FIG. 6, the apparatus body 12 includes a body frame 15 as a portion of the apparatus body 12. The body frame 15 is adjacent to a first path formation portion 42, which will be described later, in the −Z direction. The body frame 15 is formed of sheet metal bent at multiple positions and has a U-like shape opening in the +Z direction when viewed in the Y direction, for example. Specifically described, the body frame 15 has a bottom wall 15A extending in the X-Y plane, a support wall 15B extending vertically in the +Z direction from the edge in the −X direction of the bottom wall 15A, and a vertical wall 15C that is a portion of the bottom wall 15A cut and bent up in the +Z direction. The vertical wall 15C has a through hole 15D extending through the vertical wall 15C in the Y direction.

Figure 2:
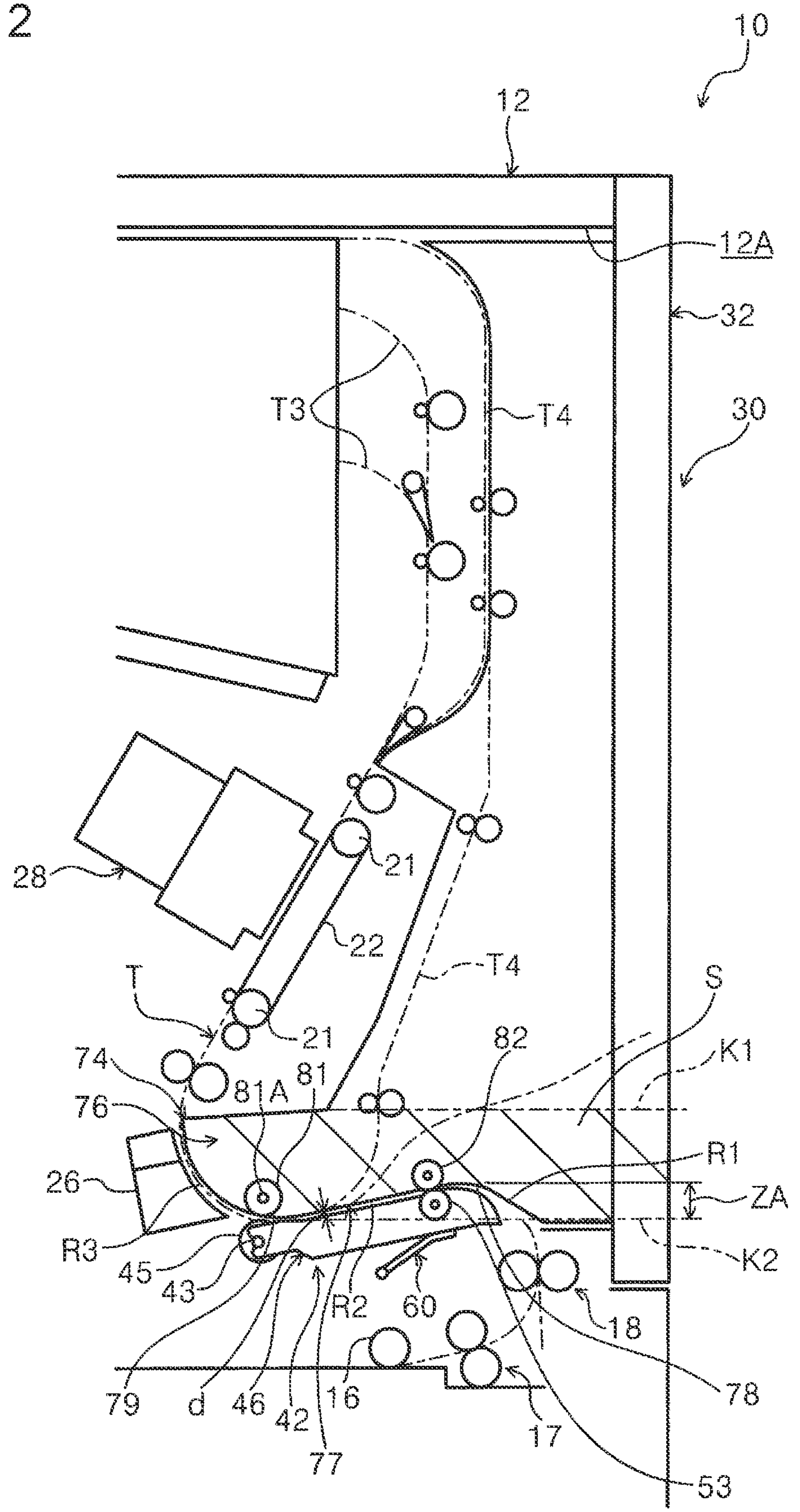
FIG. 2 is a schematic view illustrating the transportation path of paper in the printer according to an embodiment.

As illustrated in FIG. 2, the transportation portion 30 includes, for example, the apparatus body 12, the cover 32, the first path formation portion 42, a second path formation portion 74, and a movement portion 60. As described above, the apparatus body 12 has the transportation path T having the introduction path R1, the downward path R2, and the upward path R3. The downward path R2 is a path along which the paper P is transported downward in the Z direction. The upward path R3 is located downstream of the downward path R2 in the transportation direction of the paper P. The upward path R3 is a path along which the paper P is transported upward in the Z direction. The downward path R2 and the upward path R3 are defined by the first path formation portion 42 and the second path formation portion 74, which will be described later. The downward path R2 and the upward path R3 of the transportation path T have portions located at the same level in the area ZA defined in the Z direction.

Figure 3:
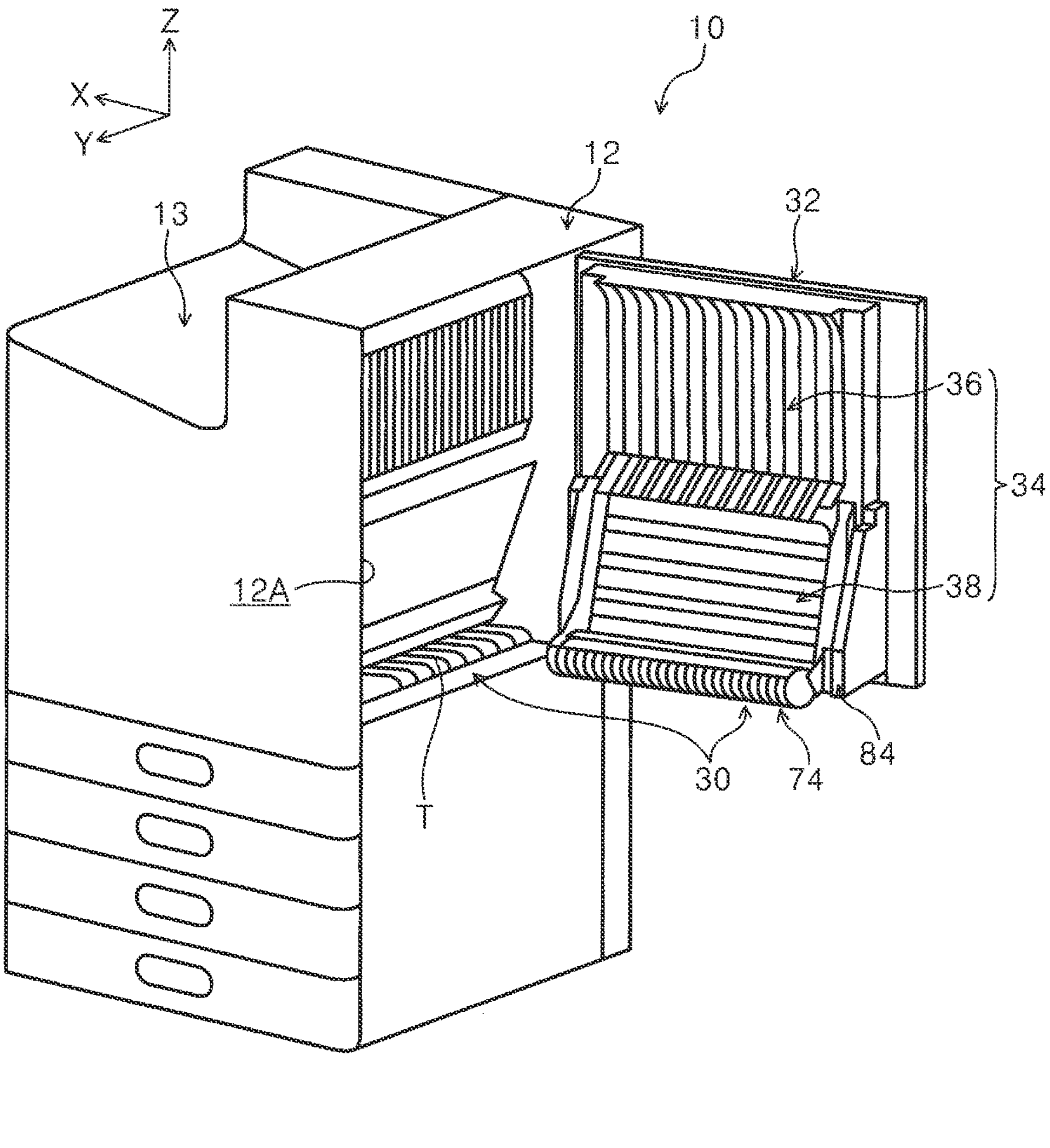
FIG. 3 is a perspective view illustrating the printer according to an embodiment in which the transportation path is uncovered.

As illustrated in FIG. 3, the cover 32 has a plate-like shape having a predetermined thickness. The cover 32 is attached to the end in the −Y direction of the opening 12A at the end in the −X direction of the apparatus body 12 by hinges (not illustrated). This enables the cover 32 to turn about the shaft extending in the Z direction. The cover 32 turns to open and close the opening 12A and thus covers or uncovers the transportation path T. In other words, the cover 32 is configured to turn to an opening position to uncover the transportation path T and turn to a closing position to cover the transportation path T. Furthermore, an inversion path formation member 34 and the second path formation portion 74, which will be described later, are attached to the cover 32, for example. The inversion path formation member 34 has an upper portion 36 that forms an upper section of the inversion pathway T4 (FIG. 1) located above the center in the Z direction and a lower portion 38 that encloses a lower section of the inversion pathway T4 located below the center in the Z direction. The second path formation portion 74 is attached to the lower portion 38.

Figure 4:
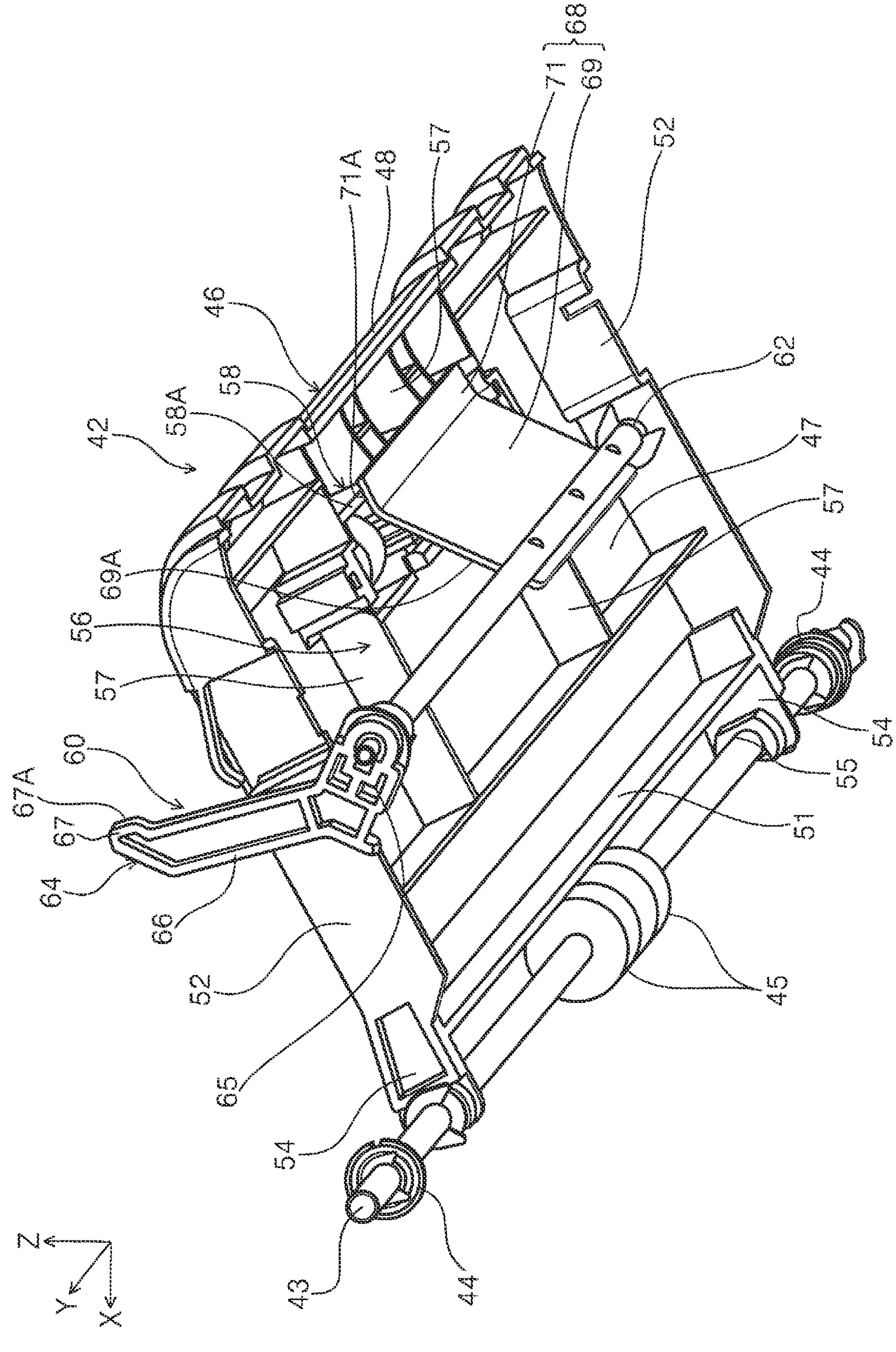
FIG. 4 is a perspective view illustrating a lower guide and a movement portion that are included in a transportation portion according to an embodiment and are viewed from below.

FIGS. 2 and 4 illustrate the first path formation portion 42 and the movement portion 60 defining the transportation path T. The first path formation portion 42 is movable to a first position and a second position in the apparatus body 12. The first path formation portion 42 positioned at the first position defines a portion of the downward path R2. The first path formation portion 42 positioned at the second position is away from the downward path R2 in the −Z direction. The first path formation portion 42 includes, for example, a lower guide 46 that supports the paper P and a first rotation shaft 43 that supports the lower guide 46 in such a manner that the lower guide 46 is turned to the first position or the second position.

As illustrated in FIG. 2, the first rotation shaft 43 is adjacent to the transportation path T in the −Z direction at a curved connection between the downward path R2 and the upward path R3. The first rotation shaft 43 is located below a movement area S of the second path formation portion 74, which will be described later, in the Z direction. A portion of the first path formation portion 42 away in the −X direction from the center is positioned in the movement area S of the second path formation portion 74 when the cover 32 is in the closed state. The second transportation roller 81 is adjacent to the first rotation shaft 43 in the +Z direction. The second transportation roller 81 includes a shaft 81A extending in the Y direction and sandwiches the paper P with the first transportation roller 45, which will be described later, and transports the paper P downstream when being rotated.

As illustrated in FIG. 4, the first rotation shaft 43 has a cylindrical shape extending in the Y direction. The first rotation shaft 43 is rotatably supported at the ends in the Y direction by bearings 44 disposed on a frame (not illustrated) of the apparatus body 12 (FIG. 1). The first rotation shaft 43 has the first transportation roller 45 in the central region in the Y direction. The first transportation roller 45 is rotated by rotation of the first rotation shaft 43. The first transportation roller 45 transports the paper P. In this embodiment, two first transportation rollers 45 are disposed with a distance therebetween in the Y direction, for example.

The lower guide 46 is an example of a medium support and includes an upper wall 47, a front wall 48, a rear wall 51, two side walls 52, two arms 54, a reinforcing portion 56, and a supported portion 58. In the following explanation, positions of these components are described by using the lower guide 46 positioned at the second position or positioned horizontally in the X direction. The upper wall 47 has a rectangular plate-like shape having a thickness in the Z direction. The width in the Y direction of the upper wall 47 is larger than that of the paper P. The front wall 48 extends in the −Z direction from the edge in the −X direction of the upper wall 47. The upper wall 47 and the front wall 48 are connected by a curved surface. The rear wall 51 extends in the −Z direction from the edge in the +X direction of the upper wall 47. The two side walls 52 extend in the −Z direction from the edges in the Y direction of the upper wall 47 and extend in the X direction to connect the front wall 48 and the rear wall 51.

Figure 5:
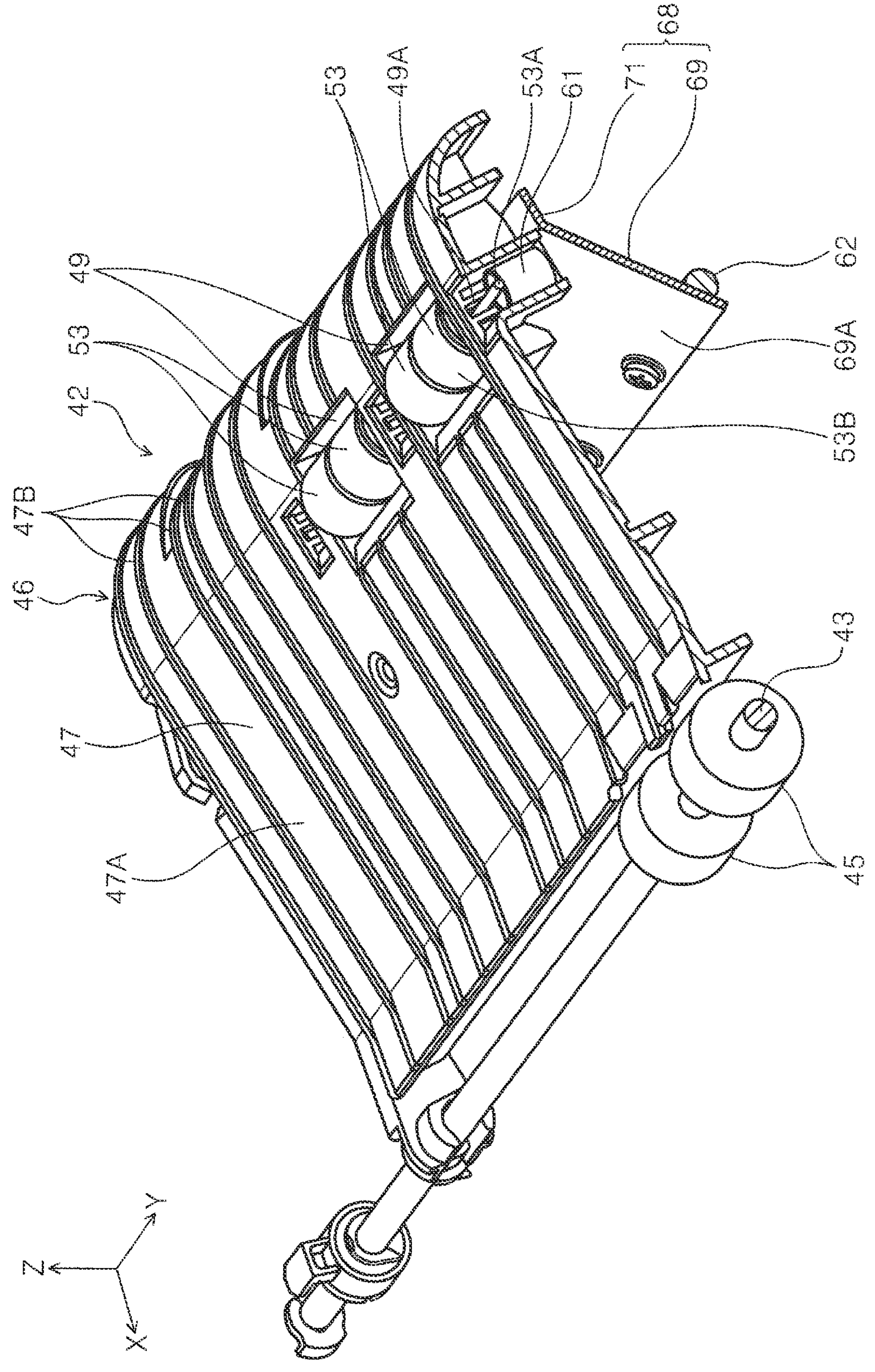
FIG. 5 is a perspective view illustrating a portion of the lower guide includes in the transportation portion according to an embodiment.

As illustrated in FIG. 5, the upper wall 47 has holders 49 recessed in the −Z direction in the upper surface 47A at positions away in the −X direction from the center in the X direction. Support rollers 53 are rotatably disposed in the holders 49 with the axial direction thereof extending in the Y direction. The holders 49 have grooves 49A that guide a shaft 53A, which will be described later, in the Z direction. The support roller 53 has a cylindrical shape and has the shaft 53A and an outer surface 53B. The outer surface 53B partly protrudes from the upper surface 47A in the +Z direction. The support roller 53 supports the paper P being transported and transports the paper P further downstream. The upper surface 47A has multiple ribs 47B.

Figure 7:
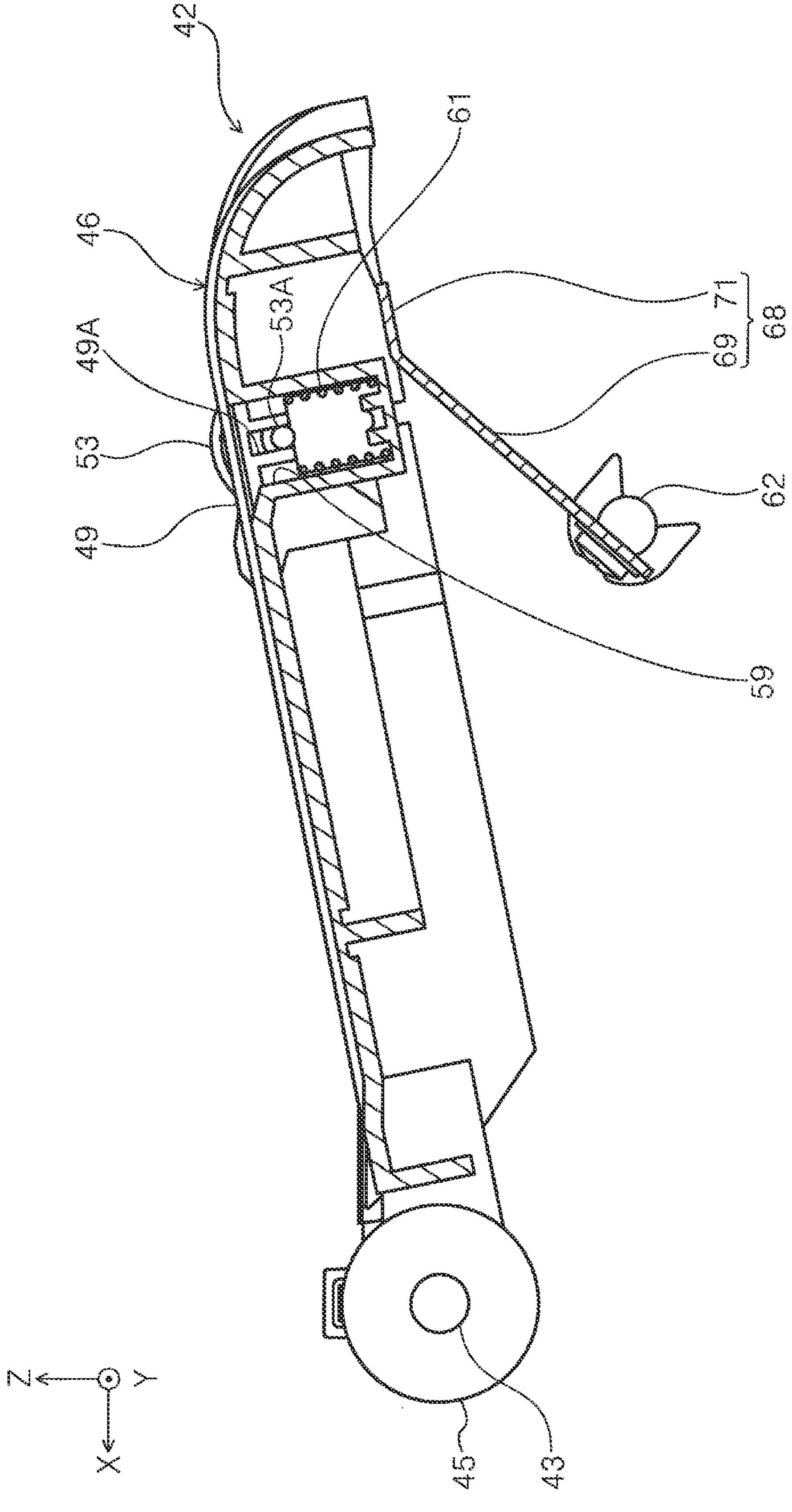
FIG. 7 is a vertical cross-sectional view illustrating the lower guide that is included in the transportation portion according to an embodiment and supported by a support.

As illustrated in FIG. 7, a spring holder 59 is disposed outwardly from the holder 49 of the lower guide 46 in the Y direction. The spring holder 59 holds a coil spring 61. The coil spring 61 is stretchable in the Z direction to push the shaft 53A in the +Z direction. The support roller 53 may be moved in the −Z direction by an external force. In such a case, since the shaft 53A is pushed by the coil spring 61 in the +Z direction, the support roller 53 stops at a position where the external force is balanced with a reaction force.

As illustrated in FIG. 4, the arms 54 extend in the +X direction from the edges in the +X direction of the side walls 52 beyond the rear wall 51. The arms 54 are longer in the X direction than the radius of the first transportation roller 45. The arm 54 has a cutout 55 at the end in the +X direction. The cutout 55 has a U-like shape opening in the +X direction when viewed in the Y direction. The cutout 55 is in contact with and slidable on the outer surface of the first rotation shaft 43. In other words, the lower guide 46 is rotatable or swingable on the first rotation shaft 43 with the cutout 55 being in contact with the first rotation shaft 43.

The reinforcing portion 56 includes multiple vertical walls 57 extending from the upper wall 47 in the −Z direction. The supported portion 58 is disposed on some of the reinforcing portions 56. The supported portion 58 is a wall extending from the upper wall 47 in the −Z direction and located away in the −X direction from the center in the X direction. The supported portion 58 has an end surface 58A that is a flat surface extending in the X-Y plane at the end in the −Z direction.

The movement portion 60 moves the first path formation portion 42 to the above-described first or second position in response to opening or closing of the cover 32 (FIG. 3). Specifically described, the movement portion 60 moves the first path formation portion 42 to the second position when the cover 32 is opened and moves the first path formation portion 42 to the first position when the cover 32 is closed. The movement is caused not only by application of force to the lower guide 46 but may be caused by cancelation of the support for the lower guide 46. The lower guide 46 may be moved while being supported. In this embodiment, the movement portion 60 is an example of a retainer that holds the first path formation portion 42 at the first position. In other words, the movement portion 60 also functions as the retainer. The movement portion 60 stops holding the first path formation portion 42 when the cover 32 is opened.

The movement portion 60 includes, for example, a second rotation shaft 62, a lever 64, and a support 68. The second rotation shaft 62 is adjacent to the lower guide 46 in the −Z direction. The second rotation shaft 62 has a cylindrical shape extending in the Y direction. The second rotation shaft 62 is rotatably supported by the vertical wall 15C (FIG. 6) of the body frame 15 at the ends in the Y direction. The second rotation shaft 62 has the support 68, which will be described later, in the central region in the Y direction.

The lever 64 is fixed to an end in the +Y direction of the second rotation shaft 62, for example. The lever 64 is located on the +Y direction side of one of the side walls 52 that is located on the +Y direction side. The lever 64 comes in contact with a contacted surface 86 (FIG. 8) of the cover 32, which will be described later, to turn the second rotation shaft 62 in response to opening or closing of the cover 32. The lever 64 has an attachment portion 65 extending from the second rotation shaft 62 in the radial direction, an extension portion 66 extending from the end of the attachment portion 65 in a direction intersecting the radial direction, and a contact portion 67 located at a forward end of the extension portion 66. The extension portion 66 extends in the +Z direction beyond the upper wall 47 when viewed from the +Y direction. The contact portion 67 protrudes from the extension portion 66 in the −X direction. The contact portion 67 has a trapezoidal shape having an upper base on the −X direction side when viewed from the +Y direction. The contact portion 67 has a contact surface 67A at the upper base of the trapezoidal shape.

The support 68 is fixed to the second rotation shaft 62 and supports the lower guide 46 at the first position, for example. Furthermore, the support 68 has a first plate 69 extending from the second rotation shaft 62 toward the lower guide 46 in the −X direction and the +Z direction and a second plate 71 extending in the −X direction from an end of the first plate 69 that is remote from the second rotation shaft 62. The support 68 supports the lower guide 46 when an upper surface 71A of the second plate 71 facing in the +Z direction is in contact with the end surface 58A. In other words, the movement portion 60 holds the lower guide 46.

When the movement portion 60 moves the first path formation portion 42 to the second position, a distance between the first path formation portion 42 and the second path formation portion 74 (FIG. 2), which will be described later, is kept at a distance equal to or larger than a predetermined distance d (FIG. 2). The predetermined distance d is a minimum distance between the first path formation portion 42 and the second path formation portion 74 in the Z direction for transportation of the paper P when the first path formation portion 42 is positioned at the first position and opposed to the second path formation portion 74. The movement portion 60 moves up the first path formation portion 42 in the Z direction to move up the support roller 53 to a nipping position where the support roller 53 and a counter roller 82 (FIG. 2), which will be described later, are put in a nipping state.

The lever 64 is in contact with the cover 32 when the cover 32 is in the closed state and the lever 64 is away from the cover 32 when the cover 32 is in the open state. Specifically described, when the cover 32 is in the closed state, the contact surface 67A of the lever 64 is in contact with the contacted surface 86 of a contacted portion 84 (FIG. 8), which will be described later. The support 68 supports the lower guide 46 when the lever 64 is in contact with the cover 32.

As illustrated in FIG. 6, when the first path formation portion 42 is positioned at the second position, the lower guide 46 is positioned horizontally in the X direction. In this state, an upper surface 69A of the first plate 69 facing in the +Z direction is in contact with the end surface 58A, and thus the support 68 supports the lower guide 46. As described above, in one example, the support 68 supports the lower guide 46 regardless of whether the first path formation portion 42 is positioned at the first position or the second position.

As illustrated in FIG. 2, the second path formation portion 74 is disposed on the end portion in the −Z direction of the cover 32. When the cover 32 closes the opening 12A or the cover 32 covers the transportation path T, the second path formation portion 74 forms the upward path R3 and forms the downward path R2 with the first path formation portion 42. In this embodiment, a component of the cover 32 that forms the downward path R2 and the upward path R3 is the second path formation portion 74.

When viewed in the Y direction, an area between an imaginary line K1 extending in the X direction through the end in the +Z direction of the second path formation portion 74 and an imaginary line K2 extending in the X direction through the end in the −Z direction of the second path formation portion 74 is referred to as a movement area S of the second path formation portion 74. the second path formation portion 74 moves within the movement area S when the cover 32 is opened and closed. In FIG. 2, a hatched area is the movement area S.

Figure 8:
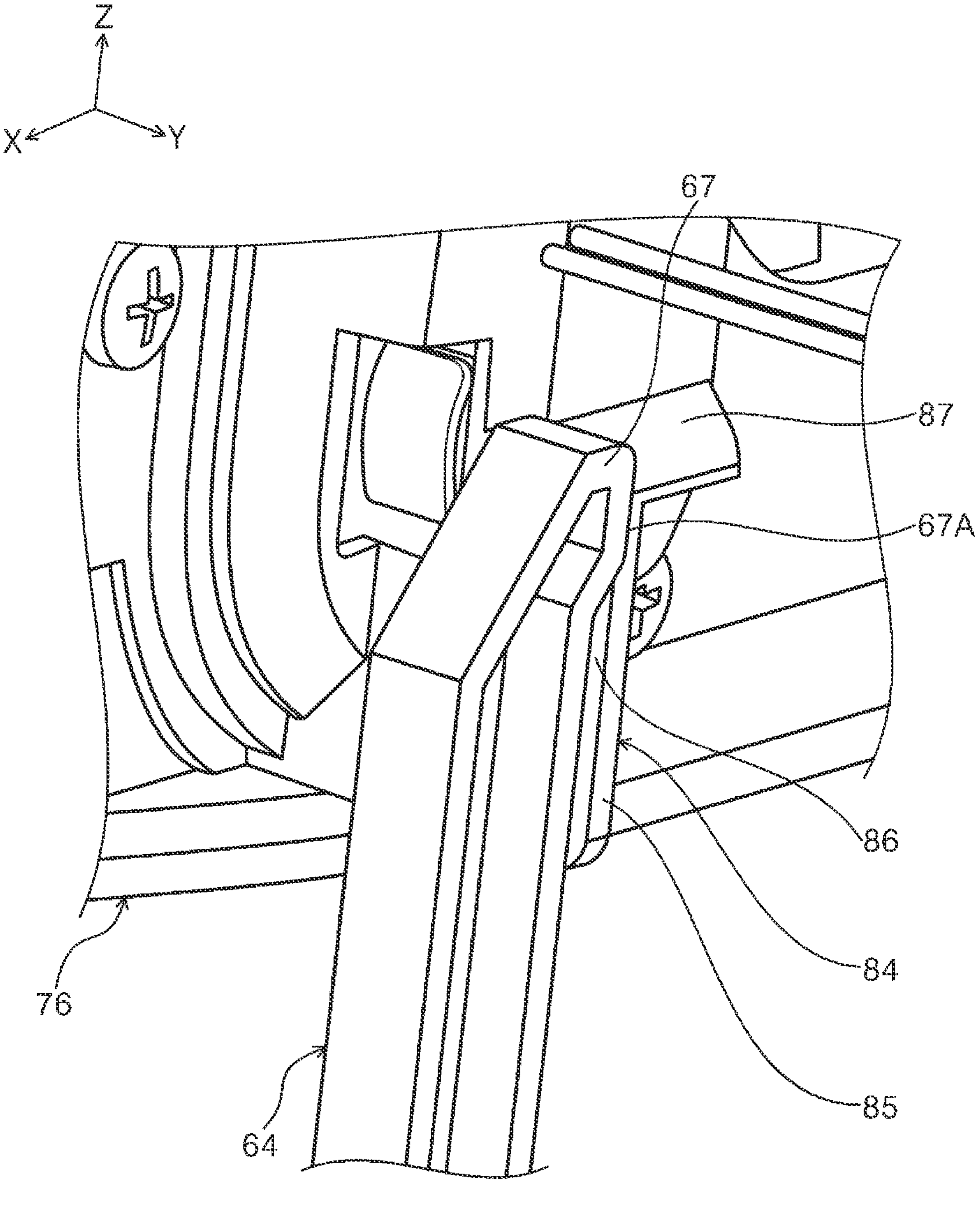
FIG. 8 is a perspective view illustrating a lever that is included in the transportation portion according to an embodiment and is in contact with a contacted surface of a cover.
Figure 9:
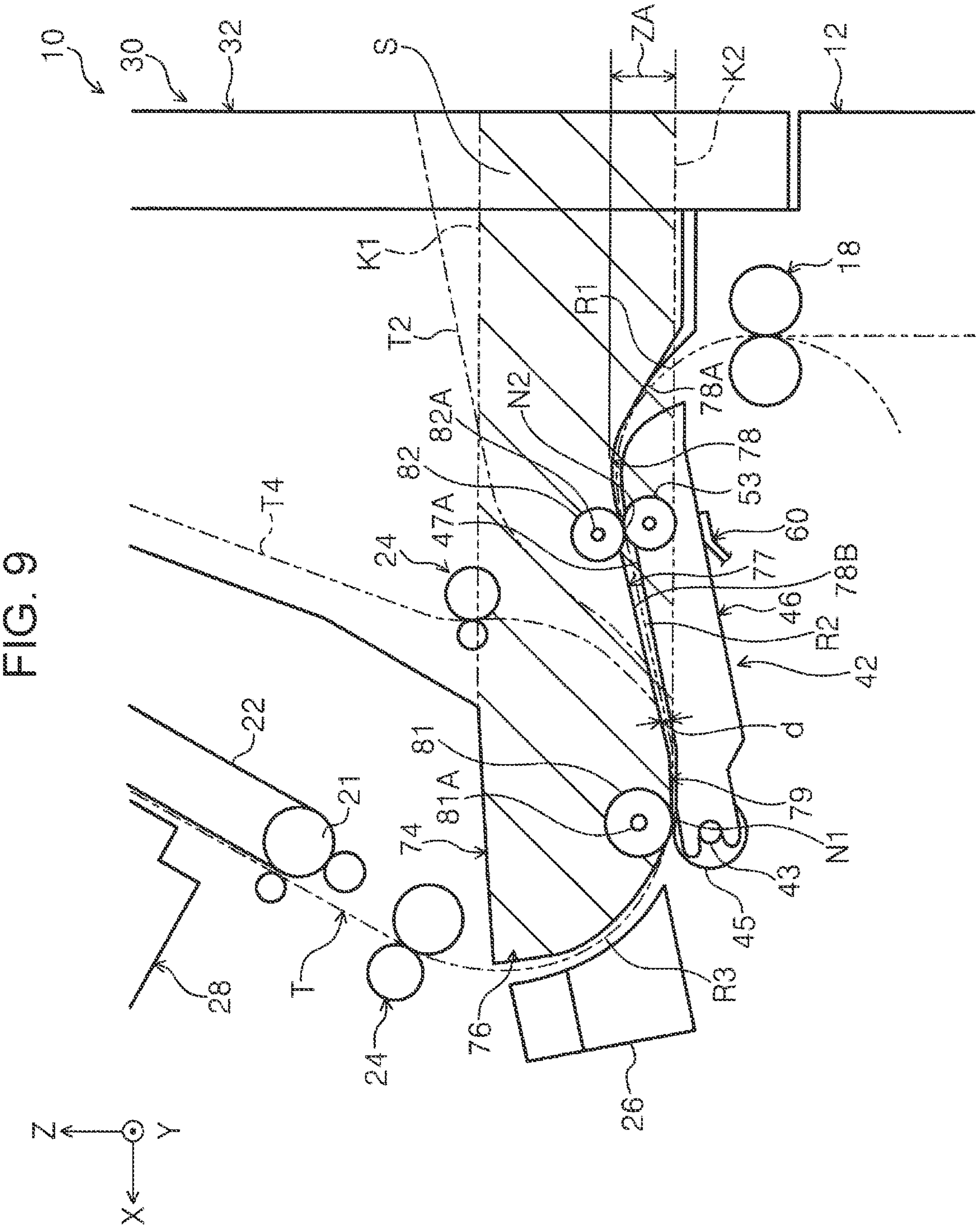
FIG. 9 is a schematic magnified view illustrating a portion of the transportation path in the transportation portion according to an embodiment.

As illustrated in FIG. 9, the second path formation portion 74 includes, for example, an upper guide 76, the second transportation roller 81, the counter roller 82, and the contacted portion 84 (FIG. 8). The upper guide 76 has a bottom wall 77 at the lower end in the −Z direction. The bottom wall 77 has a concave portion 78 facing the lower guide 46 in the Z direction and a convex portion 79 located downward of the concave portion 78 in the transportation direction of the paper P. The concave portion 78 curves inwardly in the +Z direction. The concave portion 78 has a slope surface 78A extending in the +X direction and the +Z direction and a slope surface 78B located downstream of the slope surface 78A and extending in the +X direction and the −Z direction. The slope surface 78B faces the upper surface 47A in the Z direction. The convex portion 79 curves outwardly in the −Z direction. The top of the convex portion 79 faces the first transportation roller 45 in the Z direction. The first path formation portion 42 and the second path formation portion 74 face each other with the predetermined distance d therebetween to form the downward path R2.

The second transportation roller 81 is disposed on the top of the convex portion 79, for example. The second transportation roller 81 includes the shaft 81A extending in the Y direction. The shaft 81A is rotatably supported by a bearing (not illustrated) disposed on the upper guide 76. The second transportation roller 81 sandwiches the paper P with the first transportation roller 45 and transports the paper P when rotated. The cover 32 in the closed state forms a nipping portion N1 at which the paper P is sandwiched between the first transportation roller 45 and the second transportation roller 81. When the cover 32 is opened, the nipping portion N1 disappears.

The counter roller 82 is adjacent to the deepest point of the concave portion 78 in the +X direction, for example. The counter roller 82 has a shaft 82A extending in the Y direction. The shaft 82A is rotatably supported by a bearing (not illustrated) disposed on the upper guide 76. The counter roller 82 faces the support roller 53 in the Z direction and sandwiches the paper P with the support roller 53 and transports the paper P when rotated. When the first path formation portion 42 is positioned at the first position, the support roller 53 and the counter roller 82 are in a nipping state and form a nipping portion N2. When the cover 32 is opened and the first path formation portion 42 is positioned at the second position, the nipping state of the support roller 53 and the counter roller 82 is cancelled.

As illustrated in FIG. 8, the contacted portion 84 is disposed on the end in the +Y direction of the upper guide 76. The contacted portion 84 is included in the cover 32 (FIG. 2). The contacted portion 84 includes, for example, a vertical wall 85 that stands upright along the Y-Z plane and a rib 87 that supports the vertical wall 85 from the −X direction. An end surface of the vertical wall 85 facing in the +X direction is the contacted surface 86 extending along the Y-Z plane. The contacted surface 86 is in contact with the contact portion 67 in the X direction during the closing operation of the cover 32 or in the closed state. The contact between the contacted surface 86 and the contact portion 67 applies a pressing force in the +X direction from the cover 32 to the lever 64 through the contacted surface 86 and the contact portion 67. The pressing force turns the lever 64 to position the first path formation portion 42 (FIG. 2) at the first position.

Next, operation of the printer 10 will be described. As illustrated in FIG. 2, the cover 32 in the closed state covers the opening 12A. The lower guide 46 is tilted such that one end in the −X direction is at a higher level in the +Z direction than the other end in the +X direction. Let's suppose that the cover 32 in the closed state is opened.

Figure 10:
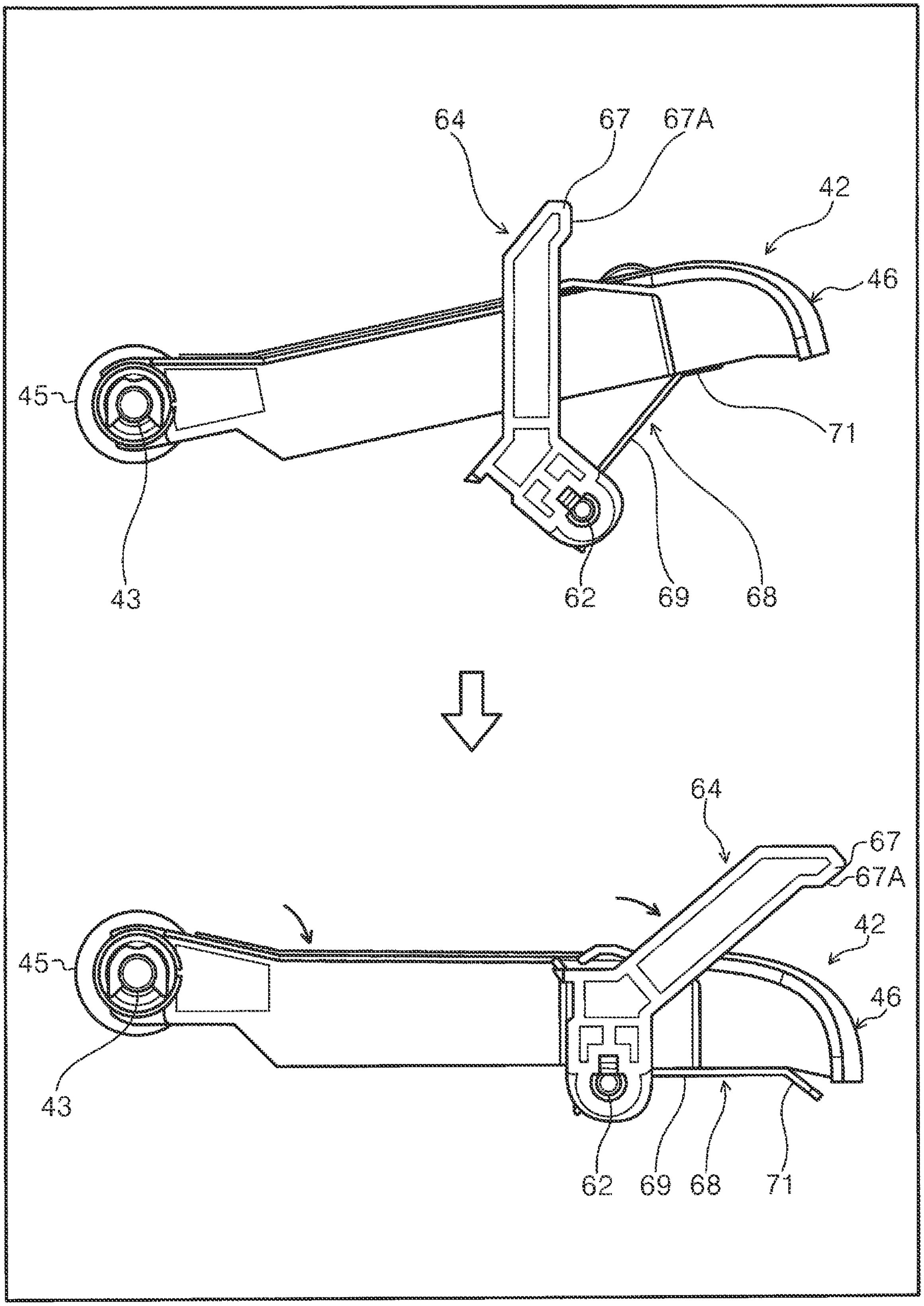
FIG. 10 is a side view illustrating how the lower guide is moved from a first position to a second position by turn of a lever in the transportation portion according to an embodiment.
Figure 11:
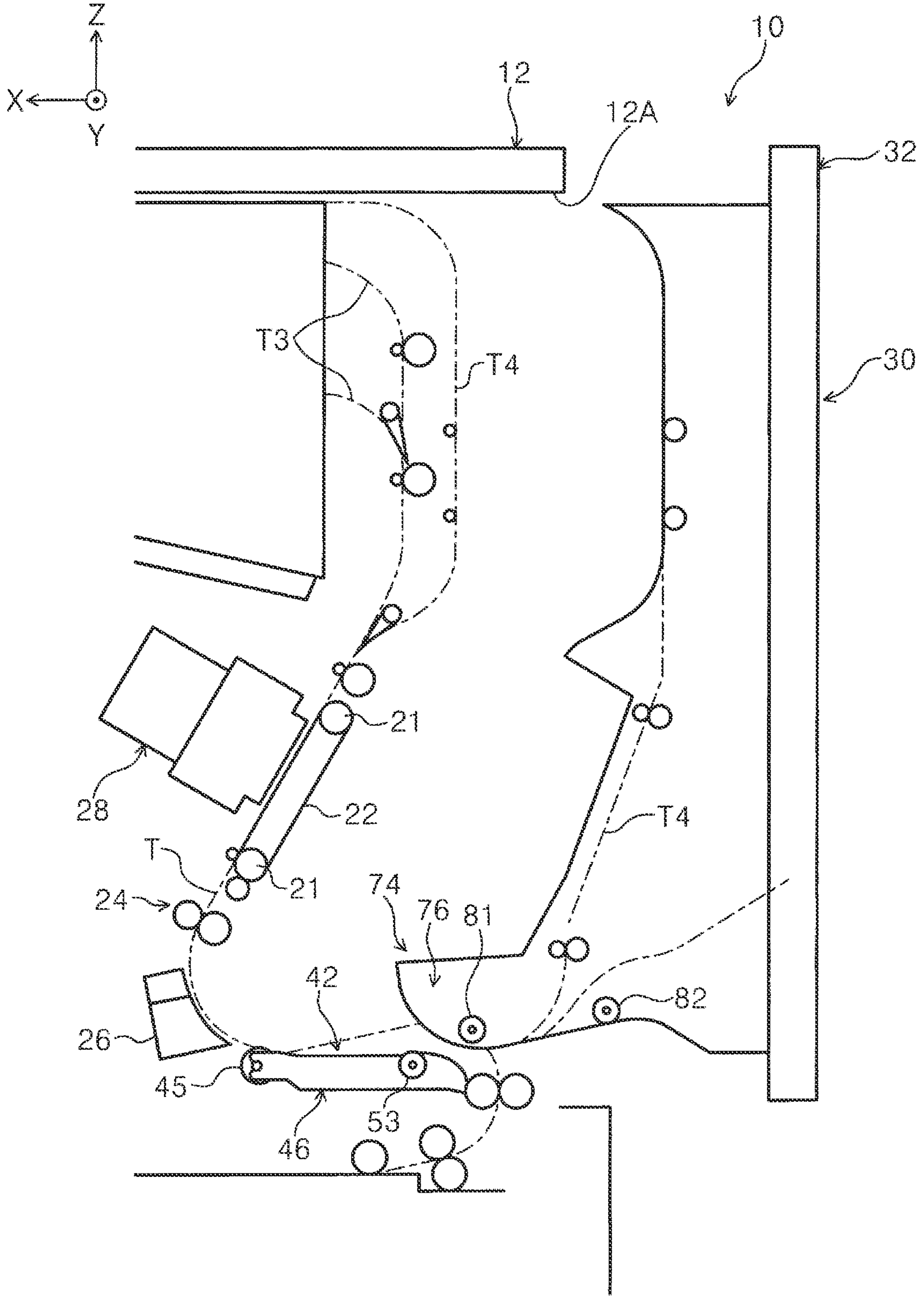
FIG. 11 is a schematic view illustrating the printer according to an embodiment in which the transportation path is uncovered by opening of the cover.

As illustrated in FIGS. 10 and 11, the contacted portion 84 (FIG. 8) moves away from the lever 64 as the cover 32 moves in the −X direction. This allows the lever 64 to freely turn and weakens the power of the support 68 to support the lower guide 46. In this state, an end portion in the −X direction of the lower guide 46 is moved down under its own weight, allowing the support 68 and the lever 64 to be turned. Then, the first plate 69 comes in contact with the body frame 15 (FIG. 6). This stops the turn of the lower guide 46. At this time, the lower guide 46 is positioned horizontally in the X direction at the second position. In other words, the first path formation portion 42 is moved away in the −Z direction from the movement area S (FIG. 9) of the second path formation portion 74. After the movement of the first path formation portion 42 away in the −Z direction, in the movement area S of the second path formation portion 74, there is no component that limits the movement of the second path formation portion 74. Thus, the cover 32 is openable to uncover the opening 12A and the transportation path T.

Contrary to the above, when the cover 32 is closed to cover the transportation path T that is uncovered, the contact portion 67 comes in contact with the contacted surface 86 (FIG. 8) to turn the lever 64 in the opposite direction. Then, the support 68 is turned in the opposite direction by the turn of the lever 64 in the opposite direction. This allows the second plate 71 to push up the end in the −X direction of the lower guide 46 in the +Z direction. Thus, the lower guide 46 is turned in the opposite direction to be positioned at the first position. At this time, the nipping portion N1 and the nipping portion N2 (FIG. 9) are formed. In this way, the cover 32 covers the transportation path T and the opening 12A.

As described above, the transportation portion 30, which includes the upward path R3 and the downward path R2 having portions located at the same level in the Z direction, has a longer transportation path T than a configuration that has a transportation path extending in a straight line in the Z direction. Furthermore, a portion of the first path formation portion 42 is positioned in the movement area S of the second path formation portion 74 when the cover 32 is in the closed state. In other words, a portion of the first path formation portion 42 and a portion of the second path formation portion 74 overlap each other in the Z direction. This makes the transportation portion 30 smaller. Furthermore, when the cover 32 is opened, the movement portion 60 moves the first path formation portion 42 to the second position such that the first path formation portion 42 is away from the movement area S of the second path formation portion 74. In this state, the cover 32 is freely openable and the transportation path T is readily uncovered. This makes it easy to remove the paper P left in the transportation path T due to jamming, for example.

In the transportation portion 30, during the movement of the first path formation portion 42 to the second position, a distance equal to or larger than the predetermined distance d is kept between the first path formation portion 42 and the second path formation portion 74. In other words, the first path formation portion 42 and the second path formation portion 74 are unlikely to be in contact with each other, reducing the possibility that the paper P left in the transportation path T will be damaged.

In the transportation portion 30, the first path formation portion 42 is moved to the first position or the second position by being turned about the first rotation shaft 43. With this simple configuration, the first path formation portion 42 is moved. Furthermore, the first rotation shaft 43 is located below the movement area S of the second path formation portion 74. Thus, the first rotation shaft 43 does not come in contact with the second path formation portion 74.

In the transportation portion 30, when the cover 32 is opened, the movement portion 60 cancels the holding of the first path formation portion 42. When the holding is cancelled, the first path formation portion 42 is supported only at one end by the first rotation shaft 43 and is turned by its own weight. With this simple configuration, the movement area S of the second path formation portion 74 is opened.

In the transportation portion 30, the lever 64 is in contact with the contacted surface 86 of the cover 32 when the cover 32 is in the closed state, and thus the lever 64 receives a pressing force. The pressing force allows the lever 64 to turn the second rotation shaft 62 and the support 68. The support 68 is turned to push up the lower guide 46 and then supports the lower guide 46 at the first position. When the cover 32 is opened, the lower guide 46 is moved down under its own weight and the support 68 is turned to open the movement area S of the second path formation portion 74. In this way, the opening and closing of the cover 32 moves the lower guide 46 or the first path formation portion 42.

The transportation portion 30 does not require a retainer as a separate component from the movement portion 60. This simplifies the configuration for moving and holding the first path formation portion 42.

In the transportation portion 30, of the nipping portions between the pairs of rollers that transport the paper P along the transportation path T, the nipping portion N formed between the first transportation roller 45 and the second transportation roller 81 disappears when the cover 32 is opened. Thus, the paper P left in the transportation path T is readily removable.

In the transportation portion 30, of the nipping portions between the pairs of rollers that transport the paper P along the transportation path T, the nipping portion N formed between the support roller 53 and the counter roller 82 disappears when the cover 32 is opened. Thus, the paper P left in the transportation path T is readily removable.

In the transportation portion 30, the movement of the first path formation portion 42 by the movement portion 60 puts the support roller 53 and the counter roller 82 into the nipping state. This simple configuration allows the support roller 53 and the counter roller 82 to be in the nipping state unlike a configuration in which the movement of the first path formation portion 42 and operation to put the support roller 53 and the counter roller 82 into the nipping state are separately performed.

In the printer 10, the same effects and advantages as those obtained in the transportation portion 30 are obtained.

The transportation portion 30 and the printer 10 according to the embodiment of the present disclosure basically have the above-described configurations. However, the configuration may be partly modified or partly omitted, without departing from the gist of the present disclosure.

In the printer 10, the first path formation portion 42 may be entirely positioned in the movement area S. The position of the downward path R2 may be changed with the position of the upward path R3 in the X direction. In other words, a portion of the transportation path T may extend in a mountain-like shape protruding in the +Z direction. The medium is not limited to the paper P and may be a film. When the movement portion 60 moves the first path formation portion 42 to the second position, the distance between the first path formation portion 42 and the second path formation portion 74 may be kept at the predetermined distance d.

In the printer 10, the first path formation portion 42 is not limited to the configuration in which the lower guide 46 turns. The lower guide 46 may slide in the −Z direction or may slide obliquely downward. The movement portion 60 and a retainer that holds the first path formation portion 42 at the first position may be separate components. For example, the retainer may have a spring. The first path formation portion 42 at the first position may be held at the first position by receiving a pressing force from the spring. Alternatively, the retainer may include a component movable in the Z direction and a motor. The motor is driven in response to opening and closing of the cover 32 to hold the first path formation portion 42.

In the printer 10, the first transportation roller 45 and the second transportation roller 81 may be omitted. The support roller 53 and the counter roller 82 may be omitted. The movement portion 60 does not need to move up the support roller 53 to the nipping position. The recording portion is not limited to the line head 28 and may be a serial head, which reciprocates in the width direction of the paper P. The apparatus height direction may be a direction intersecting the vertical direction.

What is claimed is:

1. A transportation apparatus comprising:

an apparatus body having a transportation path along which a medium is transported;

a cover disposed on the apparatus body and configured to cover and uncover the transportation path;

a first path formation portion disposed in the apparatus body and configured to be moved to a first position and to a second position, the first path formation portion defining a portion of the transportation path when positioned at the first position and being away from the transportation path when positioned at the second position;

a second path formation portion disposed on the cover, the second path formation portion defining a portion of the transportation path during a closed state in which the cover covers the transportation path; and a movement portion configured to move the first path formation portion to the first position or the second position in response to opening or closing of the cover, wherein when viewed from a direction in which the cover in the closed state opens, at least a portion of the first path formation portion overlaps the second path formation portion during the closed state, and the movement portion moves the first path formation portion to the second position when the cover is opened and moves the first path formation portion to the first position when the cover is closed.

2. The transportation apparatus according to claim 1, wherein the direction in which the cover in the closed state opens is along the horizontal.

3. The transportation apparatus according to claim 1, wherein the first path formation portion and the second path formation portion are defining the portion of the transportation path by facing each other during the closed state.

4. The transportation apparatus according to claim 3, wherein the transportation path includes an upward path along which the medium is transported upward in an apparatus height direction and a downward path along which the medium transported by the upward path is transported downward in the apparatus height direction, and the downward path and the upward path have portions located at the same level in the apparatus height direction.

5. The transportation apparatus according to claim 4, wherein the first path formation portion includes a medium support configured to support the medium and a first rotation shaft supporting the medium support in such a manner that the medium support is turned to the first position and the second position, the retainer includes a second rotation shaft, a lever fixed to the second rotation shaft and configured to turn the second rotation shaft in response to opening or closing of the cover, and a support fixed to the second rotation shaft to support the medium support at the first position, the lever is in contact with the cover when the cover is in the closed state and the lever is away from the cover when the cover is in the open state, and the support supports the medium support when the lever is in contact with the cover.

6. The transportation apparatus according to claim 3, wherein the first path formation portion and the second path formation portion are positioned to face each other with a predetermined distance therebetween to define the portion of the transportation path, and when the movement portion moves the first path formation portion to the second position, a distance between the first path formation portion and the second path formation portion is kept at a distance equal to or larger than the predetermined distance.

7. The transportation apparatus according to claim 3, further comprising a retainer configured to hold the first path formation portion at the first position, the retainer being configured to cancel the holding of the first path formation portion when the cover is opened.

8. The transportation apparatus according to claim 7, wherein the movement portion also functions as the retainer.

9. The transportation apparatus according to claim 1, wherein the first path formation portion includes a medium support configured to support the medium and a first rotation shaft supporting the medium support in such a manner that the medium support is turned to the first position and the second position, and when viewed from the direction in which the cover in the closed state opens, the first rotation shaft does not overlap the second path formation portion.

10. The transportation apparatus according to claim 9, wherein the first rotation shaft has a first transportation roller configured to transport the medium, the second path formation portion has a second transportation roller configured to transport the medium with the first transportation roller, and when the cover is in the closed state, the first transportation roller and the second transportation roller form a nipping portion at which the medium is sandwiched therebetween, and when the cover is open, the nipping portion is not formed.

11. The transportation apparatus according to claim 1, wherein the first path formation portion includes a support roller configured to support the medium, the second path formation portion includes a counter roller opposed to the support roller and configured to be rotated together with the support roller to transport the medium, when the first path formation portion is positioned at the first position, the support roller and the counter roller are in a nipping state, and when the first path formation portion is positioned at the second position, the nipping state of the support roller and the counter roller is cancelled.

12. The transportation apparatus according to claim 11, wherein the movement portion is configured to move the first path formation portion to move the support roller to a position where the support roller and the counter roller are put in the nipping state.

13. A printing apparatus comprising:

the transportation apparatus according to claim 1; and a recording portion configured to record on a medium transported by the transportation apparatus.

* * * * *